United States Patent
Joho (10) Patent No.: US 7,930,049 B2
(45) Date of Patent: Apr. 19, 2011

(54) CONTROL METHOD FOR A SUBSTRATE PROCESSING APPARATUS

(75) Inventor: Yasuhiro Joho, Toyama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 224 days.

(21) Appl. No.: 12/224,782

(22) PCT Filed: Mar. 12, 2007

(86) PCT No.: PCT/JP2007/054866
§ 371 (c)(1),
(2), (4) Date: Sep. 5, 2008

(87) PCT Pub. No.: WO2007/122902
PCT Pub. Date: Nov. 1, 2007

(65) Prior Publication Data
US 2009/0118855 A1    May 7, 2009

(30) Foreign Application Priority Data
Mar. 24, 2006   (JP) ................................ 2006-083902

(51) Int. Cl.
*G06F 19/00* (2011.01)
*G05B 19/18* (2006.01)
*G05B 11/01* (2006.01)
*G05B 23/02* (2006.01)
*G06F 11/30* (2006.01)
*G06F 11/00* (2006.01)
*G21C 17/00* (2006.01)

(52) U.S. Cl. ............. 700/96; 700/9; 700/104; 700/108; 700/169; 700/174; 702/182; 702/183; 702/184; 340/3.1; 340/3.43; 340/3.9

(58) Field of Classification Search .......... 700/9, 19–20, 700/95–96, 104, 108, 160, 169, 174; 340/3.1, 340/3.43, 5.1, 3.9; 702/182–185, 188
See application file for complete search history.

(56) References Cited

U.S. PATENT DOCUMENTS

| | | | | |
|---|---|---|---|---|
| 7,292,909 B2 * | 11/2007 | Inada et al. | ................... | 700/218 |
| 7,462,011 B2 * | 12/2008 | Yamazaki et al. | ............ | 414/754 |
| 7,524,378 B2 * | 4/2009 | Mori | ............................. | 118/708 |
| 7,702,413 B2 * | 4/2010 | Ushiku et al. | ................. | 700/121 |
| 2002/0026251 A1 * | 2/2002 | Johnson et al. | ................. | 700/67 |
| 2003/0147643 A1 * | 8/2003 | Miyata et al. | ................. | 396/564 |
| 2005/0095774 A1 * | 5/2005 | Ushiku et al. | ................. | 438/222 |

(Continued)

FOREIGN PATENT DOCUMENTS
JP         A-10-039920        2/1998
(Continued)

*Primary Examiner* — Ramesh B Patel
(74) *Attorney, Agent, or Firm* — Oliff & Berridge, PLC (57) ABSTRACT

A centralized control apparatus includes a data collecting part that gathers data at a predetermined interval from a substrate processing apparatus for each component in the substrate processing apparatus; a data processing part that determines a status of each component based on the gathered data and regulation control information including attribute information about each component, maintenance information and previously established status-determined information about each component, at a predetermined timing established for each component, and performs thinning-out-processing to the gathered data on a determination result and prepares processed data by processing data obtained by the thinning-out-processing; and a data transmitting part that sends the regulation control information including the determination result and the processed data to a terminal unit.

5 Claims, 7 Drawing Sheets

U.S. PATENT DOCUMENTS

| | | | |
|---|---|---|---|
| 2005/0105991 A1* | 5/2005 | Hofmeister et al. | 414/217 |
| 2005/0216114 A1* | 9/2005 | Hsiung et al. | 700/108 |
| 2006/0073654 A1* | 4/2006 | Mori | 438/202 |
| 2006/0215338 A1* | 9/2006 | Yokouchi et al. | 361/56 |
| 2006/0246683 A1* | 11/2006 | Pan et al. | 438/424 |
| 2007/0076942 A1* | 4/2007 | Yatsugake et al. | 382/141 |
| 2007/0131253 A1* | 6/2007 | Nakamura et al. | 134/22.1 |
| 2007/0183871 A1* | 8/2007 | Hofmeister et al. | 414/332 |

FOREIGN PATENT DOCUMENTS

| | | |
|---|---|---|
| JP | A-10-227400 | 8/1998 |
| JP | A-2002-110498 | 4/2002 |
| JP | A-2002-312021 | 10/2002 |
| JP | A-2003-015734 | 1/2003 |
| JP | A-2004-227357 | 8/2004 |
| WO | WO 2004/083977 A1 | 9/2004 |

* cited by examiner

(a) Automatically prepare mail text based on analytic result data (b) Based on analytic result data, prepare graph in accordance with level determined, followed by image-compression (gif, jpeg, etc.)

(c) Append compressed image to mail

FIG. 5

(a) Read basic information out of mail text from: YYYY@h-kokusai.com
to: XXXX@h-kokusai.com
subject: Apparatus X Alarm Message Component A
Level determined = A (exchange not yet required)
Existence percentage in allowable accuracy = 86%...
Total operation time = 605 hours, ...
...
Starting coordinate = (X, Y), unit on X-axis = X second/dot...

70
72

(b) Decode numeric data based on basic information and graph data

Component-A analysis data

Temperature
175
170
165
160
155
150
145
140

Lapse time
00:00:00
00:03:00
00:06:00
00:09:00
00:12:00
00:15:00
00:18:00
00:21:00
00:24:00
00:27:00
00:30:00
00:33:00
00:36:00
00:39:00
00:42:00
00:45:00
00:48:00

— Data

71

(c) Store decoded numeric data

CONTROL METHOD FOR A SUBSTRATE PROCESSING APPARATUS

TECHNICAL FIELD

The present invention relates to a method of controlling the status of a substrate processing apparatus, and more particularly to a method of controlling, through a network, a substrate processing apparatus remotely located.

BACKGROUND ART

The substrate processing apparatus, such as a semiconductor manufacturing apparatus, is constructed with a plurality of components. Those components are gradually consumed/deteriorated by the operation of the substrate processing apparatus. For this reason, there is a need to confirm the status of the components at a regular time interval in order to previously prevent the trouble caused by the consumption/deterioration of the components.

However, where the substrate processing apparatus is being operated remotely from the maintenance site, the maintenance worker is not allowed to confirm frequently the situation at the site. In such a case, there is a need to introduce remote monitoring through the use of a network.

Figure 6:
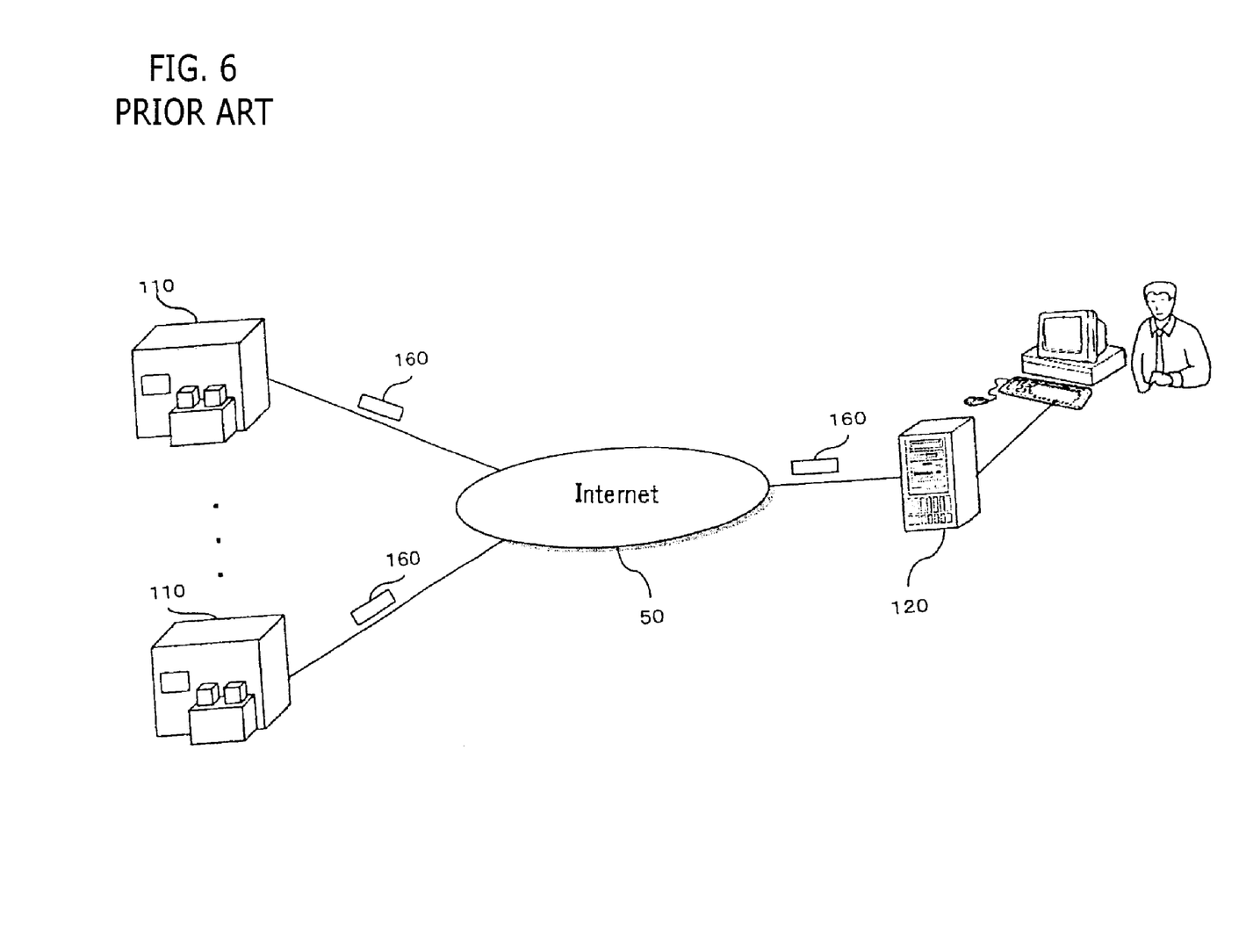
FIG. 6 is an explanatory diagram of a substrate processing system for use in the conventional real-time remote monitoring method.

There is a real-time remote monitoring method as one of the methods to remotely monitor a substrate processing apparatus. FIG. 6 shows an example of a substrate processing system for use in the real-time remote monitoring method. In the substrate processing system, connection is provided at all times through the Internet 50 between semiconductor manufacturing apparatuses 110 as substrate processing apparatuses and an administrative apparatus 120 set up remotely. The administrative apparatus 120 is to collect in real-time the numeric data 160 indicative of the status of a component from the semiconductor manufacturing apparatuses 110 and analyze it as required so that the result of analysis can be displayed on a display device provided at the administrative apparatus 120.

Figure 7:
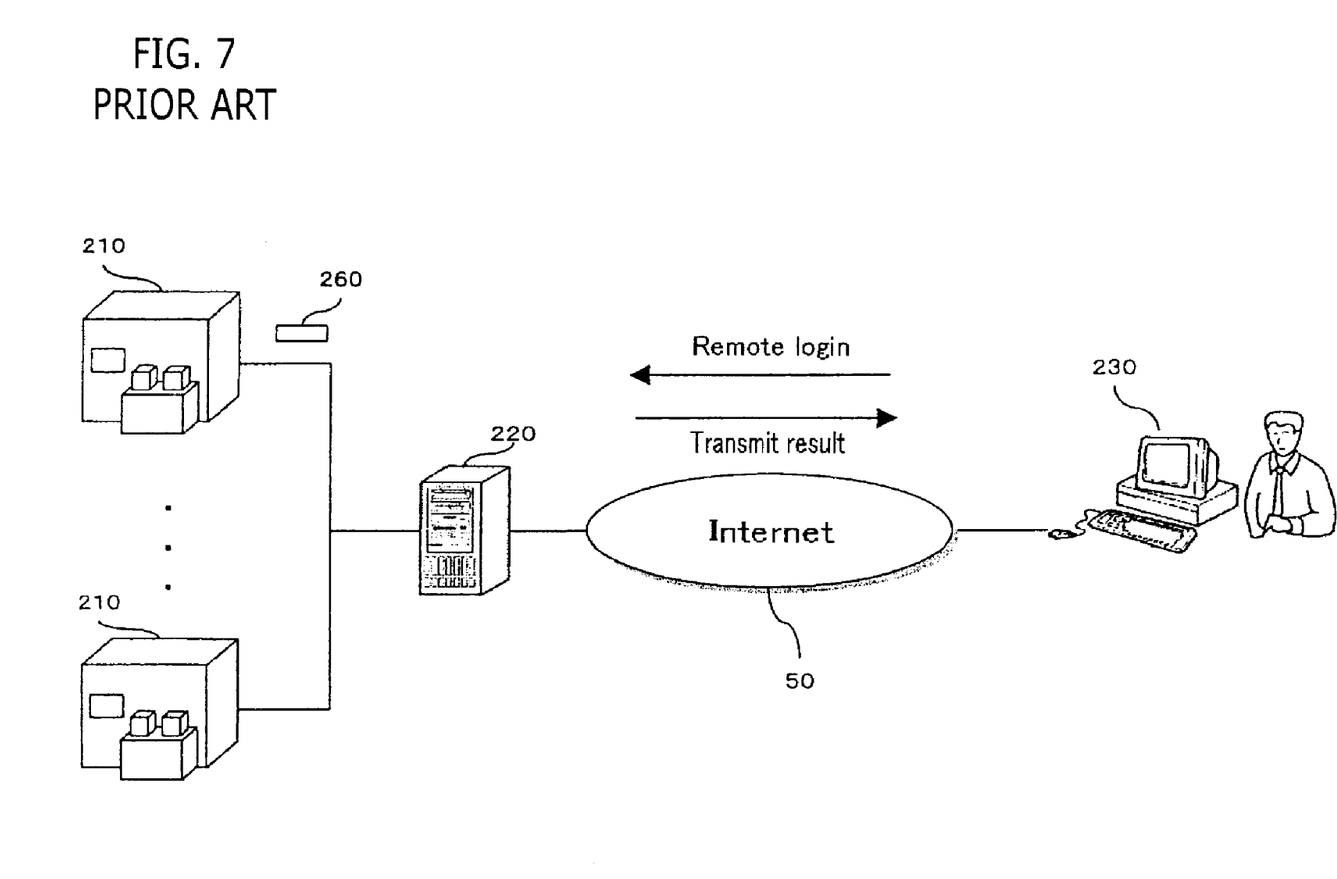
FIG. 7 is an explanatory diagram of a substrate processing system for use in the conventional remote login remote monitoring method.

There is also a remote login monitoring method as another method to remotely monitor a substrate processing apparatus. FIG. 7 shows an example of a substrate processing system for use in the remote login monitoring method. In the substrate processing system, connection is provided between a semiconductor manufacturing apparatuses 210 as substrate processing apparatus and an administrative apparatus 220 through a private line, etc. In addition, connection is also provided through the internet 50 between the administrative apparatus 220 and a terminal unit 230 set up remote from the administrative apparatus 220. The administrative apparatus 220 collects and stores the numeric data 260 indicative of a component status from the semiconductor manufacturing apparatus 210, as required. Thereafter, a terminal unit 230 remotely login the administrative apparatus 220 and causes the administrative apparatus 220 to analyze the numeric data 60. Thereafter, by transferring only the result of analysis from the administrative apparatus 220 to the terminal unit 230, the terminal unit 230 displays the result of analysis.

DISCLOSURE OF THE INVENTION

Problems that the Invention is to Solve

However, there are problems in the real-time and remote-login monitoring methods, as in the following.

In the real-time monitoring method, connection is always required between the semiconductor manufacturing apparatuses 110 and the administrative apparatus 120 through communication lines because of the necessity to send in real-time the numeric data 160 indicative of a component status to the administrative apparatus 120. In addition, the communication lines require a broad bandwidth because of the necessity to transmit a great deal of numeric data 160 to the administrative apparatus 120. This accordingly increases communication cost.

Besides, in the real-time monitoring method, there is a difficulty in using a mobile terminal, etc. low in data processing capability as an administrative apparatus 120 because the administrative apparatus 120 requires a given capability of data processing. Consequently, the maintenance worker is required to always stay at the installation site of the administrative apparatus 120, which considerably restricts the administrative site against performing real-time monitoring.

Meanwhile, in the remote login monitoring method, an analysis result only is sent to the terminal unit 230 without the transmission of numeric data 260 indicative of a component status. Accordingly, because the capacity of data transmitted through the network is smaller as compared to that of the real-time monitoring method, the line satisfactorily requires a narrower bandwidth. However, in the remote login monitoring method, the status of the semiconductor manufacturing apparatus 210 cannot be confirmed unless the maintenance worker remotely logins the administrative apparatus 220 into operation. Namely, for the maintenance worker, there is a difficulty in passively detecting a status change of the semiconductor manufacturing apparatus 210, which is unsuitable for monitoring in real-time an unforeseen event.

Therefore, it is an object of the invention to provide a control method for a substrate processing apparatus that communication cost is reduced and the restriction on control site is alleviated when the maintenance worker staying distant monitors a status change thereof in real-time.

Solving the Problem

A control method for a substrate processing apparatus according to an embodiment of the invention is a control method for a substrate processing apparatus using a substrate processing system, the system having at least one substrate processing apparatus for processing a substrate, a centralized control apparatus for gathering data from a component constituting the substrate processing apparatus, and a terminal unit for receiving control information at a site remote from the centralized control apparatus, the method comprising: gathering data at a predetermined interval from the substrate processing apparatus, on a component-by-component basis which components constitute the substrate processing apparatus; determining a status of each of the components depending upon the collection data gathered and regulation control information including attribute information about each of the components, maintenance information and previously established status-determined information about each of the components, in predetermined timing established on a component-by-component basis; preparing processed data by processing data which the collection data is thinned out depending upon the determination result; and sending the control information including the determination result and the processed data to the terminal unit.

Advantage of the Invention

The invention can provide a control method for a substrate processing apparatus capable of reducing communication cost and alleviating the restriction on the control site when the maintenance worker staying distant monitors in real-real the status change of a substrate processing apparatus.

BEST MODE FOR CARRYING OUT THE INVENTION

Figure 1:
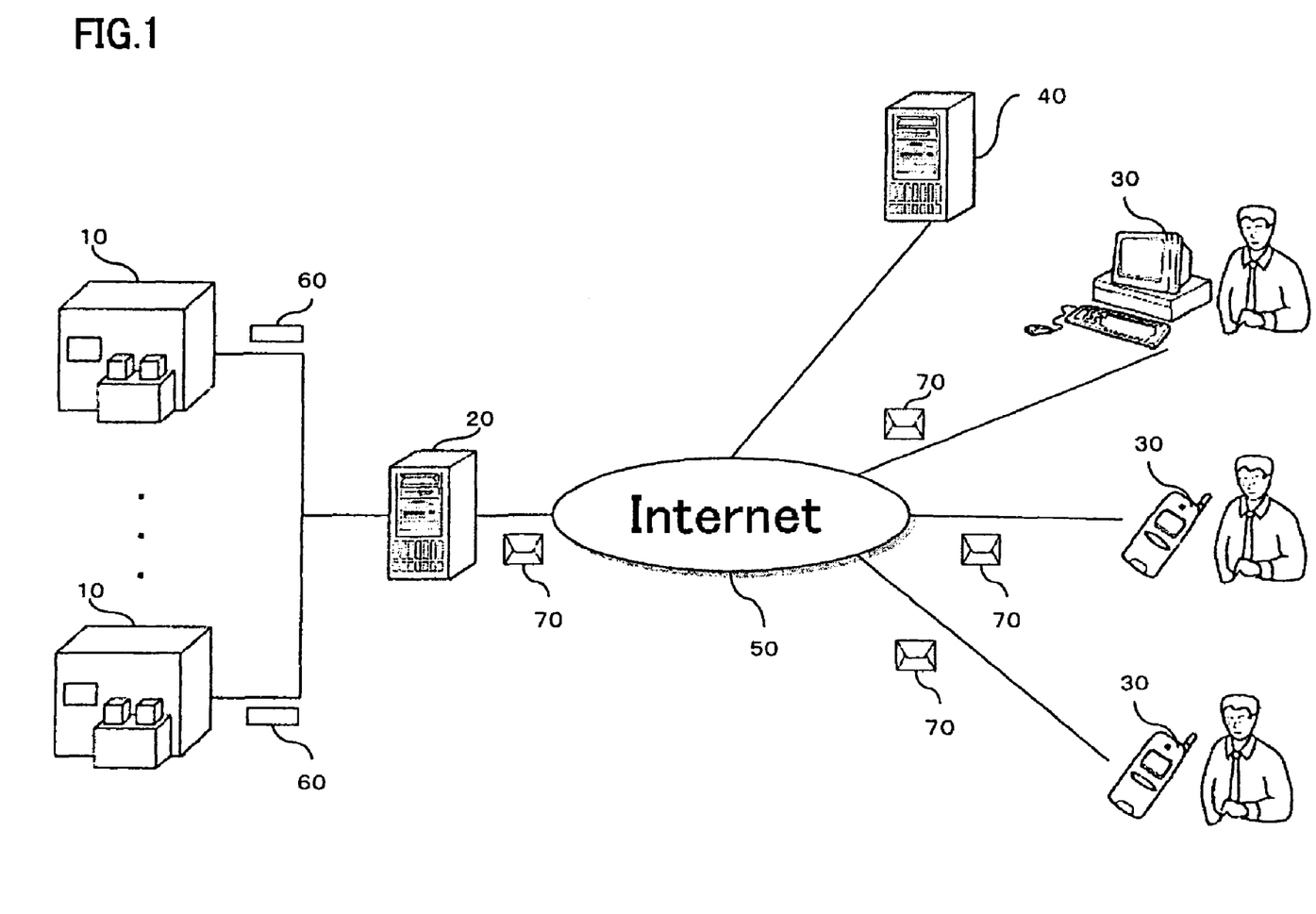
FIG. 1 is an explanatory diagram of a substrate processing system for use in a control method for a substrate processing apparatus according to an embodiment of the invention.
Figure 2:
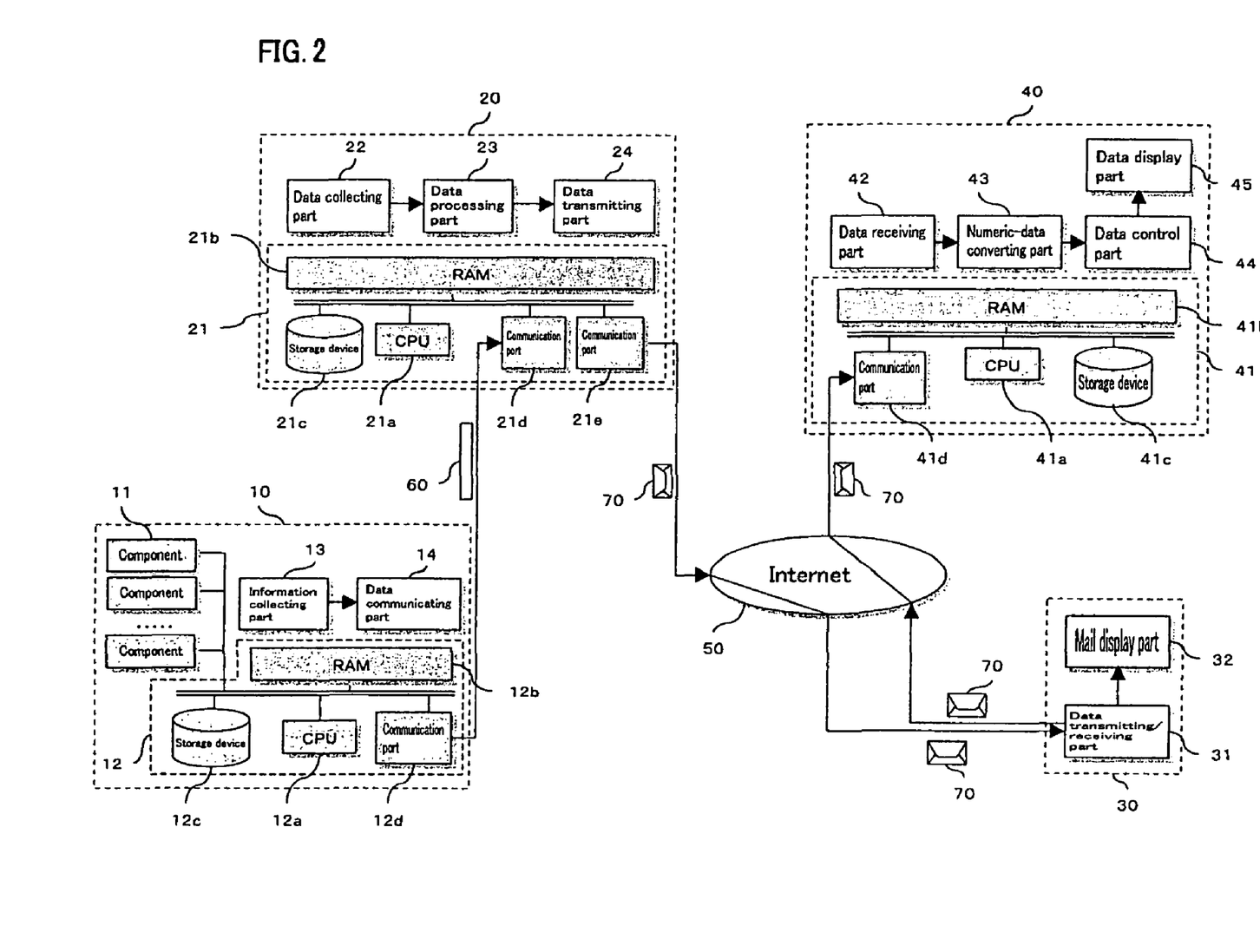
FIG. 2 is a block diagram of the substrate processing system for use in a control method for a substrate processing apparatus according to the embodiment of the invention.
Figure 3:
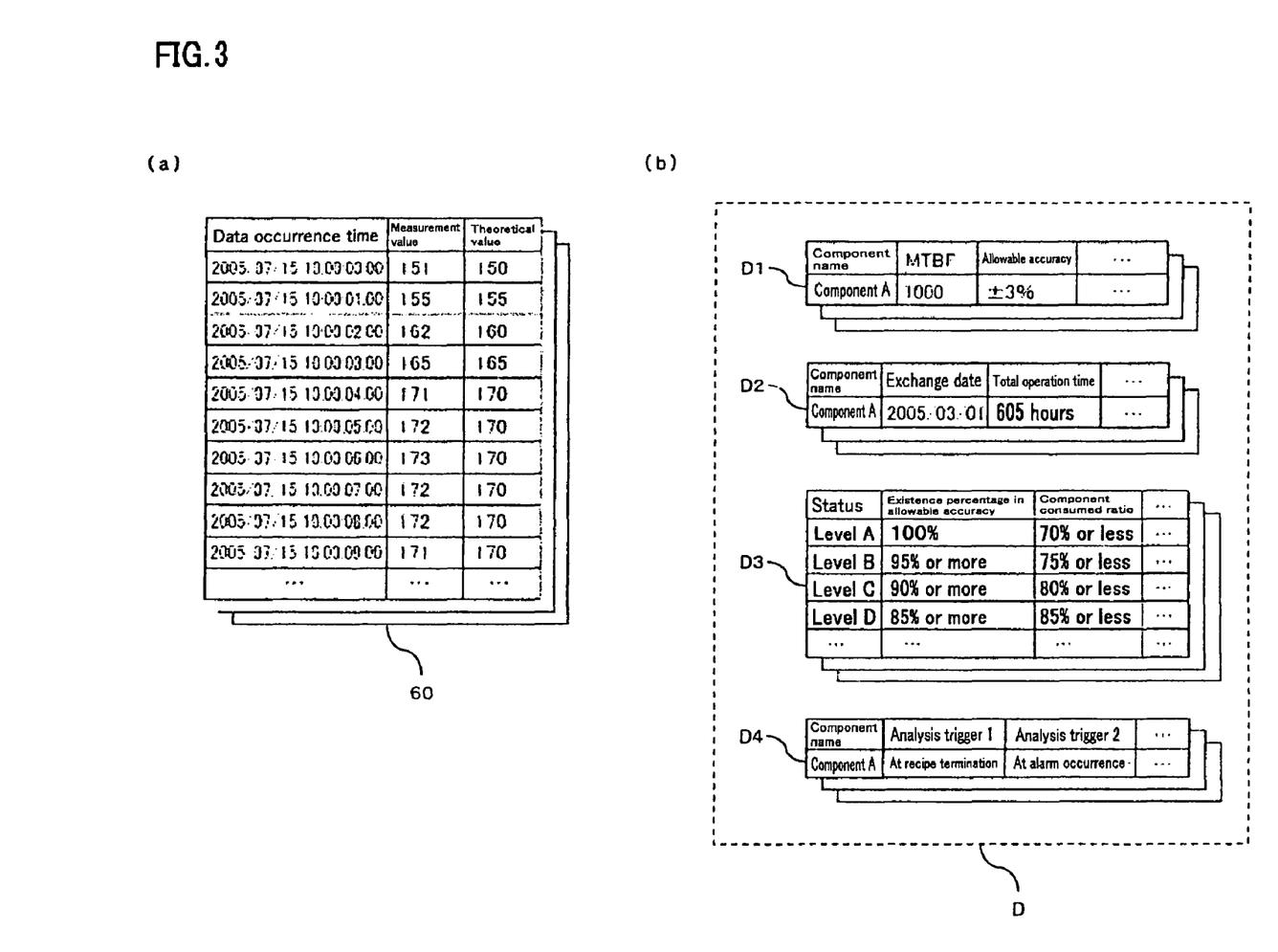
FIG. 3 is an explanatory figure showing an example of the numeric data to be gathered from a semiconductor manufacturing apparatus and an example of control information to be stored in a centralized control apparatus.
Figure 4:
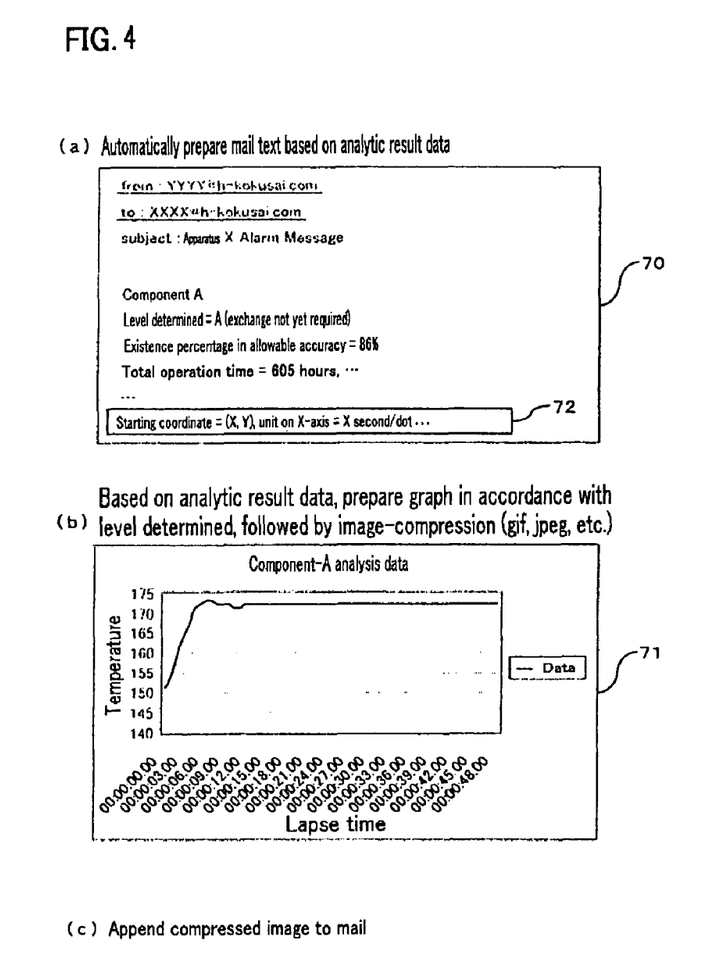
FIG. 4 is an explanatory figure exemplifying the manner that the centralized control apparatus prepares control information including a determination result and image data.
Figure 5:
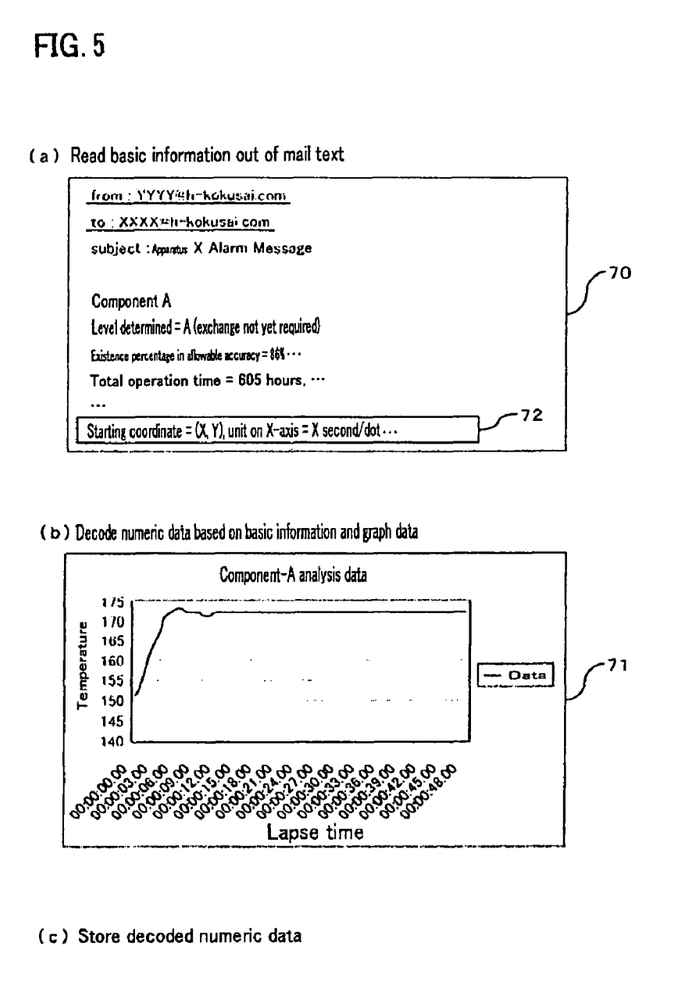
FIG. 5 is an explanatory figure exemplifying the manner that a data-control server makes a re-digitization in order to restore numeric data from image data.

An embodiment of the invention will now be explained while referring to the drawings. FIG. 1 is an explanatory diagram of a substrate processing system for use in a control method for a substrate processing apparatus according to an embodiment of the invention. FIG. 2 is a block diagram of the substrate processing system for use in the control method for a substrate processing apparatus according to the embodiment of the invention. FIG. 3 is an explanatory figure showing an example of the numeric data which a centralized control apparatus gathers from a semiconductor manufacturing apparatus and an example of the regulation control information to be stored in a centralized monitoring apparatus. FIG. 4 is an explanatory figure exemplifying the manner the centralized control apparatus prepares the control information including a determination result and image data. FIG. 5 is an explanatory figure exemplifying the manner that a data-control server makes a re-digitization in order to restore numeric data from image data.

(1) Arrangement of the Substrate Processing System

Using FIG. 1, explanation is first made on an arrangement of the substrate processing system for use in a control method for a substrate processing apparatus according to an embodiment of the invention.

As shown in FIG. 1, the substrate processing system includes a semiconductor manufacturing apparatus 10 as a substrate processing apparatus that performs processing on a substrate, a centralized control apparatus 20 as a centralized control apparatus that gathers data from the components making up the substrate processing apparatus, a terminal unit 30 as a terminal unit that receives control information remotely from the centralized control apparatus, and a data-control server 40 as a data-control server that receives the data transferred from the terminal unit.

The centralized control apparatus 20 is connected with at least one semiconductor manufacturing apparatus 10. Such connection may be a direct connection by means of a communication cable, etc. or a network connection through a private line.

The centralized control apparatus 20, the terminal unit 30 and the data-control server 40 are connected one with another through the Internet 50. Incidentally, a private network or a telephone network may be employed in place of the Internet 50. Here, the access lines from the centralized control apparatus 20, the terminal unit 30 and the data-control server 40 to the Internet 50 may be a wired line of a fixed system or a wireless line of a mobile system. Incidentally, the access line from the terminal unit 30 to the Internet 50 is preferably a mobile communication line in order to reduce the restriction on the control site of the maintenance worker.

(1-1) Configuration of the Semiconductor Manufacturing Apparatus

Using FIG. 2, explanation is now made on a configuration of the semiconductor manufacturing apparatus 10. The semiconductor manufacturing apparatus 10 has at least one or more components 11, a control part 12, an information collecting part 13 and a data transmitting part 14.

The components 11 are parts making up the semiconductor manufacturing apparatus 10, which are a current-based heater, a mass-flow controller and a pressure sensor, etc., for example.

The components 11 are gradually consumed and deteriorated by the operation of the semiconductor manufacturing apparatus 10. Thus, there is a need to monitor the status of those in order to previously prevent a trouble. The data indicative of the status of the component 11 is to be structurally read as numeric data 60, for example, from the information collecting part 13.

Numeric data 60 differs in concrete content between the types of the components 11. Namely, gathered as numeric data 60 is thermocouple-based temperature data where the component 11 is a current-base heater, a gas flow-rate where the component 11 is a mass-flow controller, or a pressure value where the component 11 is a pressure sensor.

For example, component A is taken as an example which is a resistance heater. Where the material structuring the component A has a characteristic that its temperature rise characteristic changes with the deterioration thereof, the deterioration of the component A can be indirectly found by measuring the presence or absence of or the magnitude of a deviation between a measurement value (temperature from a start of current supply) and a theoretical value (temperature of a new one, or value to be calculated from catalog characteristic values). Accordingly, the concrete content of numeric data 60 concerning the component A can be given as chronological data that is constituted with a lapse time from a start of current supply (data occurrence time), a measurement temperature (measurement value) corresponding thereto, and a theoretical value (theoretical value) corresponding thereto, as shown in FIG. 3(*a*).

A control part 12 has a function to execute the information collecting part 13 and the data transmitting part 14 that are configured as a program. The control part 12 has a CPU 12*a*, a RAM 12*b*, a storage device 12*c* such as an HDD or a flash memory, and a communication port 12*d*. The communication port 12*d* is connected to the centralized control apparatus 20.

The information collecting part 13 has a function to gather numeric data 60 indicative of the state of each component 11 and store it in the RAM 12*b* or the storage device 12*c*. The information collecting part 13 is configured as a program to be read out of the storage device 12*c* into the RAM 12*b* and to be executed by the CPU 12*a*.

The data transmitting part 14 has a function to read the numeric data 60 stored in the RAM 12*b* or the storage device 12*c* and to send it to the centralized control apparatus 20 by use of the communication port 12*d*. The data transmitting part 14 is configured as a program that is to be read out of the storage device 12*c* into the RAM 12*b* and to be executed by the CPU 12*a*.

(1-2) Configuration of the Centralized Control Apparatus

Using FIG. 2, explanation is now made on the configuration of the centralized control apparatus 20. The centralized control apparatus 20 has a control part 21, a data collecting part 22, a data processing part 23 and a data transmitting part 24.

The control part 21 has a function to execute the data collecting part 22, the data processing part 23 and the data transmitting part 24 that are configured as a program. It has a CPU 21*a*, a RAM 21*b*, a non-volatile storage device 21*c* such as an HDD or a flash memory, a communication port 21*d* and a communication port 21*e*.

The storage device 21*c* registers the regulation control information D shown in FIG. 3(*b*), on the basis of each component 11. The regulation control information D is information for use in analyzing or determining the status of the component 11. The concrete content of regulation control information D can be defined different between the types of the components 11. The detail of regulation control information D is referred later.

The communication port 21d is connected to the semiconductor manufacturing apparatus 10. Meanwhile, the communication port 21e is connected to the terminal unit 30 and the data-control server 40 through the Internet 50. The communication port 21d and the communication port 21e may be physically different independent communication ports or logically multiplexed but physically same communication ports.

The data collecting part 22 has a function to receive the numeric data 60 sent from the semiconductor manufacturing apparatus 10 by use of the communication port 21d and to store it in the storage device 21c. Incidentally, the data collecting part 22 is configured as a program to be read out of the storage device 21c into the RAM 21b and to be executed by the CPU 21a.

The data processing part 23 has a function to determine the states of each components 11 depending upon the gathered numeric data 60 and the regulation control information D, in the predetermined timing established for each component 11. Furthermore, the data processing part 23 has a function to thin out the numeric data 60 depending upon a determination result, etc. and to produce image data 71 by making the thinned-out numeric data 60 into a graph. Incidentally, the data processing part 23 is configured as a program to be read out of the storage device 21c into the RAM 21b and to be executed by the CPU 21a.

The data transmitting part 24 has a function to send an electronic mail 70 as control information, for example, to the terminal unit 30 by use of the communication port 21e. The electronic mail 70, in a certain case, is appended with image data 71. Incidentally, the data transmitting part 24 is configured as a program to be read out of the storage device 21c into a RAM 21b and to be executed by the CPU 21a.

(1-3) Configuration of the Terminal Unit

Using FIG. 2, explanation is now made on the configuration of the terminal unit 30. The terminal unit 30 has a data transmitting/receiving part 31 and a mail display part 32.

The data transmitting/receiving part 31 is connected to the centralized control apparatus 20 and data-control server 40 through the Internet 50. The data transmitting/receiving part 31 has a function to receive the electronic mail 70 sent from the centralized control apparatus 20 and to transfer the received electronic mail 70 to the data-control server 40. The electronic mail 70, in a certain case, is appended with image data 71.

The mail display part 32 has a function to display the electronic mail 70 and image data 71 received from the centralized control apparatus 20 on a display possessed by the terminal unit 30.

(1-4) Configuration of the Data-Control Server

Using FIG. 2, explanation is now made on the configuration of the data-control server 40. The data-control server 40 has a control part 41, a data receiving part 42, a numeric-data converting part 43, a data control part 44 and a data display part 45.

The control part 41 has a function to execute the data receiving part 42, the numeric-data converting part 43, the data control part 44 and the data display part 45 that are configured as a program. The control part 41 has a CPU 41a, a RAM 41b, a nonvolatile storage device 41c such as an HDD or a flash memory, and a communication port 41d. The communication port 41d is connected to the centralized control apparatus 20 and the terminal unit 30 through the Internet 50.

The data receiving part 42 has a function to store the electronic mail 70 and image data 71 received from the terminal unit 30 in the RAM 41b or the storage device 41c. Incidentally, the data receiving part 42 is configured as a program to be read out of the storage device 41c into the RAM 41b and to be executed by the CPU 41a.

The numeric-data converting part 43 has a function to read the electronic mail 70 and image data 71 into the RAM 41b and re-digitize those in order to restore the numeric data 60 the graph of the imager data 71 indicates. Incidentally, the numeric-data converting part 43 is configured as a program to be read out of the storage device 41c into the RAM 41b and to be executed by the CPU 41a.

The data control part 44 has a function to store the data, etc. which the numeric-data converting part 43 re-digitized in a manner to restore, as status-history data of the component 11 in the RAM 41b or the storage device 41c. Incidentally, the numeric-data converting part 43 is configured as a program to be read out of the storage device 41c into the RAM 41b and to be executed by the CPU 41a.

The data display part 45 has a function to display the status-history data of the component 11 on a display (not shown) possessed by the data-control server 40 in accordance with the operation of the maintenance worker. Incidentally, the data display part 45 is configured as a program to be read out of the storage device 41c into the RAM 41d and to be executed by the CPU 41a.

(2) Structure of the Regulation Control Information

Using FIG. 3(b), explanation is now made on the configuration of the foregoing regulation control information D. The regulation control information D about the component A is structured, for example, with attribute information D1, maintenance information D2, status-determined information D3 and analytic timing information D4, and is stored in the storage device 21c of the centralized control apparatus 20.

(2-1) Structure of the Attribute Information

The attribute information D1 is registered with "MTBF", "allowable accuracy, etc." and so on.

"MTBF" is an abbreviation of Mean Time Between Failures, which signifies a mean time from a start of use to a failure of component A or a mean time from a restoration from a failure to the next failure of component A. "MTBF" is in units of time. For example, the component A having an MTBF of 1000 hours signifies that the component A would result in a failure in approximately 1000 hours in average.

"Allowable accuracy" is used in determining whether or not the measurement value indicated in numeric data 60 is normal. "Allowable accuracy" is in units of percent. Specifically, if the difference between a measurement value and the corresponding theoretical value is within a range of theoretical value×allowance accuracy/100, the measurement value is determined normal. For example, where the theoretical value is 150.0° C. and allowable accuracy is ±3%, the corresponding measurement value is determined acceptable if fallen within a range of 145.5° C. or higher and 155.5° C. or lower, and determined abnormal if fallen out of the range. "Allowable accuracy" is used in calculating an "existence percentage in allowable accuracy", referred later.

Besides, the attribute information D1 may be registered with environmental conditions for assuring the normal operation of the component A, e.g. operation-assured temperature, operation-assured atmospheric pressure or allowable voltage. This information is established based on the type, specification and attribute of the component 11.

(2-2) Structure of the Maintenance Information

The maintenance information D2 is registered with "exchange date" and "total operation time", for example.

"Exchange date" is the date of the last exchange as to the component A.

"Total operation time" is the post-exchange cumulative operation time of the component A. "Total operation time" is reset upon exchanging the component A, followed by being automatically updated by the centralized control apparatus 20 during the operation of the semiconductor manufacturing apparatus 10. Incidentally, whether the semiconductor manufacturing apparatus 10 is being operated or not" is monitored, for example, by making a polling from the centralized control apparatus 20 to the semiconductor manufacturing apparatus 10 or receiving an alarm at the centralized managing apparatus 20 from the semiconductor manufacturing apparatus 10. Incidentally, "total operation time" and "MTBF" are for use in calculating a "component consumed ratio", referred later.

Besides, the maintenance information D2 may be registered with information about the operation time required in exchange, the operation in the last exchange and so on. Incidentally, the information is established independently based on the type, specification and attribute of the component 11.

(2-3) Structure of the Status-Determined Information

The status-determined information D3 is defined with the "state", "existence percentage in allowable accuracy" and "component consumed ratio" of the component A, for example, on a level-by-level basis.

The "existence percentage in allowable accuracy" is calculated on the basis of the numeric data 60 and the attribute information D1, which is an indication in percentage of the ratio of "the number of cases determined normal in measurement value" to the "the number of measurement cases". Here, the "number of measurement cases" is the total number of measurements done at an interval of analytic timing, referred later. Meanwhile, "the number of cases determined normal in measurement value" is the number of cases that measurement value is determined normal out of "the number of measurement cases". Namely, where measurements are conducted 100 times in the duration in timing between the immediately preceding round and the current round of analysis wherein measurement values in the number of 97 times are determined normal, the "existence percentage in allowable accuracy" is given as 97%. Incidentally, normal/abnormal determination of a measurement value is made by whether or not the difference between the measurement value and the corresponding theoretical value is within the range of theoretical value ×allowable accuracy/100, as noted before.

The "component consumed ratio" is calculated on the basis of the attribute information D1 and the maintenance information D2, which is an indication in percentage of the ratio of the "total operation time" to the "MTBF" of the component A. Namely, where the "MTBF" of the component A is 1000 hours and the "total operation time" is 605 hours, the "component consumed ratio" is given as 60.5%.

The "status" is a definition of the status of the component A on a level-by-level basis, e.g. level A, B, C, D, . . . , in accordance with the consuming degree. Here, the level A represents the state that consuming is less in degree wherein consuming is represented greater as advanced in level as B, C, D, . . . . Incidentally, the present information is established independently based on the type, specification and attribute of the component 11.

The "status" of the component A is unambiguously fixed depending upon the values of the "existence percentage in allowable accuracy" and "component consumed ratio". For example, in case "existence percentage in allowable accuracy" is 100% and "component consumed ratio" is 60.5%, the "status" of the component A is determined as level A.

Note that, where "existence percentage in allowable accuracy" and "component consumed ratio" are not in the same level, the determination that consuming is greater is adopted. For example, even where "component consumed ratio" is within 60.5% (in level A), the status of the component A is determined as level B in status at an "existence percentage in allowable accuracy" of 97% (level B).

(2-5) Structure of the Analytic Timing Information

The analytic timing information D4 is registered with a trigger (timing) to make an analysis on the component A, e.g. "recipe termination time" and "alarm generation time". In the case that the status of the semiconductor manufacturing apparatus 10 agrees with a trigger (timing) registered, the centralized control apparatus 20 commences an analysis on the status of the component A. Incidentally, the present information is established independently based on the type, specification and attribute of the component 11.

(3) Control Method for the Semiconductor Manufacturing Apparatus

Now explanation is made on a control method for the semiconductor-manufacturing apparatus 10 according to the embodiment of the invention, while taking into account the operations of the semiconductor manufacturing apparatus 10, the centralized control apparatus 20, the terminal unit 30 and the data-control server 40.

(3-1) Operation of the Semiconductor Manufacturing Apparatus

The operation of the semiconductor manufacturing apparatus 10 is first explained with use of FIGS. 2 and 3(*a*).

The component 11 is gradually consumed and deteriorated by the operation of the semiconductor manufacturing apparatus 10. The data representing the status of the component 11 is indicated, for example, in the form of numeric data 60. As noted before, the concrete content of numeric data 60 differs between the type of the component 11. If the component A that is a resistance heater is taken as an example, numeric data 60 is given as chronological data including a lapse of time from a start of current supply (data occurrence time), the corresponding measurement temperature (measured value) and the corresponding theoretical value (theoretical value).

The data collecting part 13 gathers the numeric data 60 of the components 11 at a predetermined time interval and stores it in the RAM 12*b* or the storage device 12*c*. Incidentally, the collection period of numeric data 60 differs between the types of the components 11 but is, for example, at an interval of 1 second for the component A (FIG. 3(*a*)).

The data transmitting part 14 reads out the numeric data stored in the RAM 12*b* or the storage device 12*c* and sends it to the centralized control apparatus 20 by use of the communication port 12*d*. The data transmission of the numeric data 60 by the data transmitting part 14 may be at a request from the centralized control apparatus 20, be spontaneous from the data transmitting part 14 or be in combination thereof. The spontaneous transmission from the data transmitting part 14 may be at a regular time interval, only upon the occurrence of a particular event (e.g. when the value of numeric data 60 exceeds a threshold or when the numeric data 60 stored is in the number exceeding a threshold, etc.) or in combination thereof. Besides, it may be upon each of the transmission of all the numeric data 60 cumulated in the semiconductor manufacturing apparatus 10 or upon a transmission of only the difference thereof from that in the last transmission.

(3-2) Operation of the Centralized Control Apparatus

Using FIGS. 2 to 4, explanation is now made on the operation of the centralized control apparatus 20 by taking the case with the component A as an example.

The data collecting part 22 receives the numeric data 60 from the semiconductor manufacturing apparatus 10 by use of the communication port 21d and stores the received numeric data 60 in the storage device 21c.

The data processing part 23 monitors the status of the semiconductor manufacturing apparatus 10 and confirms whether or not the status of the semiconductor manufacturing apparatus 10 agrees with the trigger defined in the analytic timing information D4. The status of the semiconductor manufacturing apparatus 10 may be monitored by making a polling from the centralized control apparatus 20 to the semiconductor manufacturing apparatus 10 at a regular time interval, by receiving an alarm at the centralized control apparatus 20 from the semiconductor manufacturing apparatus 10 or by the combination thereof.

When the status of the semiconductor manufacturing apparatus 10 agrees with the trigger defined in the analytic timing information D4, the data processing part 23 reads the numeric data 60, attribute information D1 and maintenance information D2 of the component 11 (component A) into the RAM 21b. Then, the data processing part 23 calculates the foregoing "existence percentage in allowable accuracy" and "component consumed ratio" on the basis of the numeric data 60, attribute information D1 and maintenance information D2.

Thereafter, the data processing part 23 compares the calculated "existence percentage in allowable accuracy" and "component consumed ratio" with the status-determined information D3 and determines in which level the status of the component A lies.

Thereafter, the data processing part 23 determines the thinning-out ratio on the numeric data 60 depending upon a determination result and thins out the numeric data 60 depending upon the thinning-out ratio determined. The thinning-out ratio can be given greater at a smaller consumption of the component A and smaller at a greater consumption thereof. As for how to thin out numeric data 60, thinning out may be performed constantly in accordance with a determined level (e.g. 90 percent of numeric data 60 is thinned out at level A, 50 percent thereof is thinned out at level B), the data other than that in a particular check point such as the start or termination of the process may be thinned out, or they may be carried out in combination. Incidentally, the concrete ratio or way of thinning out can be defined different suitably for the type or handling policy of the component 11.

Incidentally, the data processing part 23 can also determine whether or not to send an electronic mail 70 to the terminal unit 30 depending upon a determination result. For example, determination can be made such that an electronic mail 70 is not sent when the component 11 is not so consumed (i.e. nearly in level A) but is sent only when consumed considerably.

Meanwhile, the data processing part 23 can also determine whether or not image data 71 is appended to the electronic mail 70 in accordance with the determination result. For example, determination can be made such that image data 71 is not appended when the component 11 is not so consumed (i.e. nearly in level A) but is appended only when it is consumed considerably. Incidentally, concrete determining criterion (i.e. in which level an electronic mail 70 is to be sent, or so) can be defined in accordance with the type or handling policy of the component 11.

Furthermore, the data processing part 23 can determine the coloration in preparing image data 71, referred later, in accordance with the determination result. For example, the graph figure to prepare is provided green/blue in line color when the component A is not so consumed (i.e. nearly in level A), and provided red/yellow in line color when it is consumed considerably, which prompts the maintenance worker to pay attentions. Incidentally, besides line colorations, background coloration can be determined similarly. Incidentally, coloration concretely can be defined different in accordance with the type and handling policy of the component 11. For example, as for the component of greater importance, the maintenance worker can be prompted to pay attentions by using red/yellow more in the component of greater importance than that in other components.

Thereafter, the data processing part 23 prepares an electronic mail 70 and image data 71, as control information, in accordance with the determination result (status level of the component 11). Note that setting can be previously made as to thinning-out ratio, necessity/un-necessity of mail transmission, necessity/un-necessity of image attachment, coloration, etc. in accordance with the status level of the component 11, as noted before.

The electronic mail 70 describes, in its text, (1) name of the component 11, (2) determination result (i.e. status level of the component 11), (3) message prompting the maintenance worker to take a proper action (e.g. exchange immediately", "exchange soon" or "exchange not yet required", etc.) correspondingly to the determination result, (4) "existence ratio in allowable accuracy" of the component 11, (5) "total operation time" of the component 11, (6) basic information 72 required for the data-control server 40 to analyze image data 71, and so on, as shown in FIG. 4(a). Incidentally, the basic information 72 includes a start coordinate (X, Y), on-X-axis unit per dot and on-Y-axis unit per dot. Note that the information, to be described in an electronic mail 70, can be independently established independently based on the type, specification and attribute of the component 11.

The image data 71 is by graph-representing the thinned-out numeric data 60, as shown in FIG. 4(b). The image data 71 may be in a bit map form but desirably is in such a compressed image form as gif or jpeg. Incidentally, the image data 71 has a size decreasing with the increase of thinning-out ratio of the numeric data 60. For example, if the numeric data 60 under sampling every second is thinned out at a time interval of 2 second (i.e. at a thinning-out ratio of 50%), the image data 71 has a length of ½ on the temporal axis (e.g. X-axis) thus allowing data compression down to approximately a half maximally in size (in a bit-map form).

Thereafter, the data transmitting part 24 sends the electronic mail 70 appended with image data 71 to the terminal unit 30 through the Internet 50 depending upon the determination result (status level of the component 11). Here, it is desirable to previously make a setting as to thinning-out ratio, necessity/un-necessity of mail transmission, necessity/un-necessity of image attachment, coloration, etc. in accordance with the status level of the component 11, as noted before.

Incidentally, the data processing part 23, in a certain case, determines to send an electronic mail 70 to the terminal unit 30 as to each of a plurality of components 11 (e.g. components A1, A2, A3, A4). In such a case, the data transmitting part 24 may send a plurality of (four in the present case) electronic mails 70 describing separately the status levels on a component-by-component A1-A4 basis, send one electronic mail 70 describing collectively the status levels of the components 11, or send an electronic mail 70 describing only the status level of a worse one in status level (i.e. far from the level A) out of the components A1-A4. In the above, the electronic mail 70 may be appended with a plurality of ones of image data 71 separately representing the status of the components 11, appended with one of image data 71 collectively representing the status of the components 11, or appended with image data 71 representing only the status level of a worse one in status level (i.e. far from the level A) out of the components A1-A4. In this case, thinning-out ratio, coloration, etc. may be properly determined depending upon the respective status levels of the components A1-A4.

Meanwhile, the data processing part 23, in a certain case, determines to send, to the terminal unit 30, electronic mails 70 as to the respective ones of the components 11 different in type (e.g. components A, B). In such a case, each of thinning-out ratio, necessity/un-necessity of transmission of the electronic mail 70, necessity/un-necessity of attachment of the image data 71 may be determined separately on a component-by-component A, B basis. As described above, electronic mails 70 may be sent in plurality separately, sent collectively as one in the number, or sent only as to the component 11 worse in status level (i.e. far from the level A). Meanwhile, the electronic mail 70 may be appended with a plurality of ones of image data 71 of the components 11 separately, appended with image data 71 integrated into one, or appended with only the image data 71 of the component 11 worse in status level (i.e. far from the level A). In this case, thinning-out ratio, coloration, etc. may be properly determined depending upon the respective status levels of the components A, B.

(3-3) Operation of the Terminal Unit

Using FIG. 2, explanation is now made on the operation of the terminal unit 30. The data transmitting/receiving part 31 receives an electronic mail 70 appended with image data 71 from the centralized control apparatus 20.

Thereafter, the mail display part 32 displays the electronic mail 70 and image data 71 received from the centralized control apparatus 20, on the display possessed by the terminal unit 30.

Thereafter, the data transmitting/receiving part 31 transfers the electronic mail 70 appended with image data 71 to the data-control server 40 according to the determination of the maintenance worker.

(3-4) Operation of the Data-Control Server 40

Using FIGS. 2 and 5, explanation is now made on the configuration of the data-control server 40.

The data receiving part 42 stores the electronic mail 70 and image data 71 received from the terminal unit 30, in the RAM 41b or the storage device 41c.

The numeric-data converting part 43 reads the electronic mail 70 and image data 71 into the RAM 41b. Then, it reads such basic information 72 as a graph start coordinate (X, Y), on-k-axis unit per dot, on-Y-axis unit per dot, a line color, out of the text of the electronic mail 70. Based on the read-out basic information 72, the image data 71 is analyzed and re-digitized in a manner to restore the numeric data 60 the graph indicates.

Thereafter, the data control part 44 stores, as status-history data of the component 11, the data re-digitized for the numeric-data converting part 43 to restore and the analysis data obtained by processing the re-digitized data according to various statistic techniques, in the RAM 41b or the storage device 41c.

Thereafter, the data display part 45 displays the status-history data of the component 11 on the display possessed by the data-control server 40 according to the operation of the maintenance worker.

According to the above, the following effects can be obtained in the one embodiment of the invention.

The centralized control apparatus 20 thins out the numeric data 60 gathered from the semiconductor manufacturing apparatus 10, to make the thinned-out numeric data 60 into a graph and prepares image data 71 and send the electronic mail 70 appended with image data 71 to the terminal unit 30. Accordingly, the transmission data to the terminal unit 30 satisfactorily requires smaller in amount as compared to the case of sending all the numeric data 60 as it is. Namely, line bandwidth is satisfactorily narrow to reduce the communication cost.

Meanwhile, because the centralized control apparatus 20 makes a determination of the status of the component 11, a thinning-out of the numeric data 60 based on a determination result and a preparation of an electronic mail 70 and image data 71, the terminal unit 30 is allowed to use a mobile terminal (cellular phone), etc. low in data processing capability, thus alleviating the restriction of control site for the maintenance worker.

Meanwhile, the centralized control apparatus spontaneously makes a status determination of the component 11, a thinning-out of the numeric data 60 based on the result of determination, a preparation and transmission of an electronic mail 70 and image data 71 even unless making a remote operation using the terminal unit 30. Consequently, the maintenance worker is allowed to passively detect a status change of the semiconductor manufacturing apparatus 10. Meanwhile, because the status change of the semiconductor manufacturing apparatus 10 can be passively detected, the maintenance worker is not required to access the centralized control apparatus 20 from the terminal unit 30 at all times. Thus, communication cost can be reduced.

Meanwhile, if the numeric data 60 gathered from the substrate processing apparatus is sent as the numeric data 60 is to the terminal unit 30, the maintenance worker is difficult in rapidly recognizing a status change of the component. However, according to the one embodiment of the invention, the data which the numeric data 60 is thinned out is made into a graph into image data 71 so that an electronic mail 70 appended with image data 71 can be sent to the terminal unit 30. Thus, the maintenance worker is allowed to recognize a status change of the component with easiness and rapidness.

Meanwhile, the data-control server 40 centrally control the re-digitized data for restoration, as history data of the semiconductor manufacturing apparatus 10, which enables utilization as a reference in considering the future maintenance period, operation procedure, etc.

According to the finding by the present inventors, status notification is required in real-time and with accuracy for the component considerable consumed/deteriorated whereas status notification is not required in detail for the component not so consumed/deteriorated. Namely, if notifying a detail analytic result on every component regardless of component status, there is encountered an increase of communication cost and an increase of the burden of monitoring upon the maintenance worker.

For this reason, the one embodiment of the invention can relieve the maintenance worker of the burden of monitoring by making an accurate status notification only of the component considerably consumed/deteriorated.

Unless a detailed status notification is made on the component not so consumed/deteriorated, the risk of security can be reduced because no pieces of information about components normally operating are transmitted onto the Internet 50.

Meanwhile, in the foregoing real-time monitor method, because the semiconductor manufacturing apparatus 10 is to directly access the Internet 50, there is assumed a problem of security, e.g. the semiconductor manufacturing apparatus 10 be remotely operated or obstructed in operation by a malicious third party. However, in the present one embodiment, the problem of security can be solved because of not direct connection between the semiconductor manufacturing apparatus 10 and the terminal unit 30, i.e. not direct access of the semiconductor manufacturing apparatus 10 to the Internet 50.

PREFERRED EMBODIMENT OF THE INVENTION

According to one aspect of the invention, there is provided a control method for a substrate processing apparatus using a substrate processing system, the system having at least one substrate processing apparatus for processing a substrate, a centralized control apparatus for gathering data from a component constituting the substrate processing apparatus, and a terminal unit for receiving control information at a site remote from the centralized control apparatus, the method comprising: gathering data at a predetermined interval from the substrate processing apparatus, on a component-by -component basis which components constitute the substrate processing apparatus; determining a status of each of the components depending upon the collection data gathered and regulation control information including attribute information about each of the components, maintenance information and previously established status-determined information about each of the component, in predetermined timing established on a component-by-component basis; preparing processed data by processing data which the collection data is thinned out depending upon the determination result; and sending the control information including the determination result and the processed data to the terminal unit.

According to another aspect of the invention, there is provided a centralized control apparatus connected to at least one substrate processing apparatus that processes a substrate and to a terminal unit that receives control information remotely, and for gathering data from components constituting the substrate processing apparatus, the apparatus comprising: a part which gathers data at a predetermined interval from the substrate processing apparatus, on a component-by-component basis which components constitute the substrate processing apparatus; a part which determines a status of each of the components depending upon the collection data gathered and regulation control information including attribute information about each of the components, maintenance information and previously established status-determined information about each of the component, in predetermined timing established on a component-by-component basis; apart which prepares processed data by processing data which the collection data is thinned out depending upon a determination result; and a part which sends the control information including the determination result and the processed data to the terminal unit.

According to the above aspects, the centralized control apparatus thins out the collection data gathered from the substrate processing apparatus and prepares processed data by processing the thinned-out collection data, thereby sending control information including a determination result and processed data to the terminal unit. This accordingly requires less amount of transmission data to the terminal unit thus reducing the communication cost. Meanwhile, because the centralized control apparatus is to make a status determination of the component, a thinning-out of the collection data depending upon the result of determination and a processing of the data which the collection data is thinned out, the terminal unit can use a mobile terminal, etc. low in data processing capability thus alleviating the maintenance worker of the restriction on the control site. In addition, the centralized control apparatus spontaneously performs a status determination of the component, a thinning-out of the collection data depending upon the result of determination, a processing of the data from which the collection data is thinned out and a transmission of control information including the determination result and the processed data even when any operation is not made from the terminal device. Consequently, the maintenance worker is allowed to passively detect a status change of the substrate processing apparatus.

According to another aspect of the invention,
there is provided a control method for a substrate processing apparatus using a substrate processing system, the system having at least one substrate processing apparatus for processing a substrate, a centralized control apparatus for gathering data from a component constituting the substrate processing apparatus, a terminal unit for receiving control information at a site remote from the centralized control apparatus, and a data-control server for receiving data transferred from the terminal unit, the method comprising: gathering numeric data at a predetermined interval from the substrate processing apparatus, on a component-by-component basis which components constitute the substrate processing apparatus; determining a status of each of the components depending upon the numeric data gathered and regulation control information including attribute information about each of the components, maintenance information and previously established status-determined information about each of the component, in predetermined timing established on a component-by-component basis; preparing image data by making, into a graph, data which the numeric data is thinned out depending upon the determination result, and sending the control information including the determination result and the image data to the terminal unit; and using the data control server, receiving the image data which the terminal unit transferred and re-digitizing same in order to restore the numeric data.

According to another aspect of the invention,
there is provided a centralized control apparatus connected to at least one substrate processing apparatus that processes a substrate and to a terminal unit that receives control information remotely, and for gathering data from components constituting the substrate processing apparatus, the apparatus comprising: a part which gathers numeric data at a predetermined interval from the substrate processing apparatus, on a component-by-component basis which components constitute the substrate processing apparatus; a part which determines a status of each of the components depending upon the numeric data gathered and regulation control information including attribute information about each of the components, maintenance information and previously established status-determined information about each of the component, in predetermined timing established on a component-by-component basis; a part which prepares image data by making, into a graph, data which the numeric data is thinned out depending upon the determination result; and a part which sends the control information including the determination result and the image data to the terminal unit.

If the numeric data gathered from the substrate processing apparatus be sent, as the numeric data is, to the terminal unit, the maintenance worker is difficult to rapidly recognize the status change of the component. However, according to the above aspect, the maintenance worker is allowed to recognize a status change of the component with easiness and rapidness because of preparing image data by making, into a graph, the data which the numeric data is thinned out and sending control information including the image data to the terminal unit.

Meanwhile, according to the above aspects, the data-control server centrally controls, as history data of the substrate processing apparatus, the data digitized for restoration, which enables utilization as a reference in considering the future maintenance period, operation procedure, etc.

Other Embodiments

Although the semiconductor processing apparatus 10 was shown as an example of the substrate processing apparatus, the semiconductor manufacturing apparatus 10 is not limitative, i.e. an apparatus for processing a glass substrate, such as of an LCD device, is also applicable. Meanwhile, substrate processing is not limitative in detail and may be annealing, oxidation, nitriding, diffusion or the like without limited to film forming. Meanwhile, film forming may be CDV, PVD, a process of forming an oxide or nitride film, a process of forming a film containing a metal.

DESCRIPTION OF REFERENCE NUMERALS AND SIGNS

10 Semiconductor manufacturing apparatus (substrate processing apparatus)
11 Components
20 Centralized control apparatus
D Regulation Control information
D1 Attribute information
D2 Maintenance information
D3 Status-determined information
22 Data collecting part
23 Data processing part
24 Data transmitting part
30 Terminal unit
40 Data-control server
50 Internet
60 Numeric data (collection data)
70 Electronic mail (control information)
71 Image data

The invention claimed is:

1. A method for controlling substrate processing in a substrate processing system, the system including
at least one substrate processing apparatus for processing a substrate, the substrate processing apparatus comprising a plurality of components;
a centralized control apparatus for gathering data from each of the components, and
a terminal unit for receiving control information at a site remote from the centralized control apparatus, the method comprising:
gathering data by the centralized control apparatus at a predetermined interval from the substrate processing apparatus for each of the components;
determining a status of each of the components by the centralized control apparatus based on the gathered data and regulation control information, the regulation control information including attribute information, maintenance information and previously established status-determined information about each of the components, at a predetermined timing established for each of the components to determine a level of the status of each of the components as a determination result;
performing a thinning-out-processing of the gathered data by the centralized control apparatus based on the determination result of the status of each of the components, wherein in the performing the thinning-out-processing of the gathered data, a thinning-out ratio is determined based on the determination result, and then the thinning-out-processing is performed on the gathered data based on the thinning-out ratio;
preparing processed data by the centralized control apparatus by processing data obtained by the thinning-out-processing; and
sending the control information including the determination result and the processed data to the terminal unit by the centralized control apparatus.

2. The method of claim 1, wherein in the determining the status of each of the components, existence percentage in allowable accuracy and component consumed ratio are calculated based on the gathered data, the attribute information and the maintenance information, and then the existence percentage in allowable accuracy and the component consumed ratio are compared with the status-determined information.

3. A centralized control apparatus connected to at least one substrate processing apparatus that processes a substrate and to a terminal unit that receives control information remotely, and gathers data from components constituting the substrate processing apparatus, the apparatus comprising:
a data collecting part which gathers data at a predetermined interval from the substrate processing apparatus for each of the components which constitute the substrate processing apparatus;
a data processing part which determines a status of each of the components based on the gathered data and regulation control information, the regulation control information including attribute information, maintenance information and previously established status-determined information about each of the components, at a predetermined timing established for each of the components, and performs thinning-out-processing of the gathered data based on a determination result and prepares processed data by processing data obtained by the thinning-out-processing; and
a data transmitting part which sends the control information including the determination result and the processed data to the terminal unit,
wherein
the data processing part calculates a thinning-out ratio based on the determination result, and then performs the thinning-out-processing of the gathered data based on the thinning-out ratio.

4. A method for controlling substrate processing in a substrate processing system, the system including
at least one substrate processing apparatus for processing a substrate, the substrate processing apparatus comprising a plurality of components, a centralized control apparatus for gathering data from each of the components, a terminal unit for receiving control information at a site remote from the centralized control apparatus, and a data-control server for receiving data transferred from the terminal unit, the method comprising:

gathering numeric data by the centralized control apparatus at a predetermined interval from the substrate processing apparatus for each of the components;

determining a status of each of the components by the centralized control apparatus based on the gathered numeric data and regulation control information, the regulation control information including attribute information about each of the components, maintenance information and previously established status-determined information about each of the components, at a predetermined timing established for each of components wherein a level of the status of each of the component is determined as a determination result;

performing a thinning-out-processing of the gathered numeric data by the centralized control apparatus based on the determination result of the status of each of the components, wherein in the performing the thinning-out-processing to the gathered data, a thinning-out ratio is determined based on the determination result, and then the thinning-out-processing is performed on the gathered data based on the thinning-out ratio;

preparing image data showing data obtained by the thinning-out-processing graphically, sending the control information including the determination result and the image data to the terminal unit by the centralized control apparatus; and receiving the image data transferred by the terminal unit, and numerizing the image data again in order to restore the numeric data by the data control server.

5. A centralized control apparatus connected to at least one substrate processing apparatus that processes a substrate and to a terminal unit that receives control information remotely, and gathers data from components constituting the substrate processing apparatus, the apparatus comprising:

a data collecting part which gathers numeric data at a predetermined interval from the substrate processing apparatus for each of the components which constitute the substrate processing apparatus;

a data processing part which determines a status of each of the components based on the gathered numeric data and regulation control information, the regulation control information including attribute information, maintenance information and previously established status-determined information about each of the components, at a predetermined timing established for each of the components, and performs thinning-out-processing of the gathered numeric data based on a determination result, and prepares image data showing data obtained by the thinning-out-processing graphically; and a data transmitting part which sends the control information including the determination result and the processed data to the terminal unit, wherein the data processing part determines a thinning-out ratio based on the determination result, and then performs the thinning-out-processing of the gathered numeric data based on the thinning-out ratio.

\* \* \* \* \*